United States Patent [19]
Saito et al.

[11] Patent Number: 5,536,771
[45] Date of Patent: Jul. 16, 1996

[54] AQUEOUS CROSSLINKED POLYMER PARTICLES AND THEIR PRODUCTION

[75] Inventors: Koichi Saito, Kyoto; Masanori Ohiwa, Neyagawa; Manabu Yoshioka, Daito; Shuhei Yamoto, Kadoma; Tsuyoshi Imamura, Katano, all of Japan

[73] Assignee: Nippon Paint Co., Ltd., Osaka, Japan

[21] Appl. No.: 77,445

[22] Filed: Jun. 17, 1993

Related U.S. Application Data

[63] Continuation-in-part of Ser. No. 934,339, Aug. 25, 1992, abandoned.

[51] Int. Cl.⁶ .............................................. C08L 9/04
[52] U.S. Cl. ........................ 524/460; 523/201; 524/547; 524/556; 524/558; 524/559
[58] Field of Search ........................ 523/201; 524/460, 524/547, 558, 559

[56] References Cited

U.S. PATENT DOCUMENTS

| | | | |
|---|---|---|---|
| 4,499,212 | 2/1985 | Martino | 523/201 |
| 4,880,842 | 11/1989 | Kowalshi et al. | 521/64 |
| 4,920,175 | 4/1990 | Kanda et al. | 525/110 |
| 5,070,120 | 12/1991 | Sakamoto et al. | 523/412 |
| 5,157,084 | 10/1992 | Lee et al. | 525/301 |

*Primary Examiner*—Edward J. Cain
*Attorney, Agent, or Firm*—Townsend & Banta

[57] ABSTRACT

Disclosed are aqueous crosslinked polymer particles which provide excellent properties and paint workability. Aqueous crosslinked polymer particles have 20 to 200 nm of an average particle size (De), measured by a transmission electron microscope after dyeing with uranyl acetate, and also have 0.5 to 0.9 of an average roundness (R) represented by the equation:

$$R=(Lc/L)^2$$

wherein Lc is a perimeter of a circle, having the same area as that of a particle measured by the transmission electron microscope, and L is a perimeter of a particle measured actually. A process for producing aqueous crosslinked polymer particles is also disclosed.

8 Claims, No Drawings

AQUEOUS CROSSLINKED POLYMER PARTICLES AND THEIR PRODUCTION

CROSS REFERENCE TO A RELATED APPLICATION

This is a continuation-in-part application of application Ser. No. 07/934,339 filed Aug. 25, 1992, now abandoned.

FIELD OF THE INVENTION

The present invention relates to aqueous crosslinked polymer particle which impart excellent properties and coating workability to a paint by formulating them in an aqueous paint, and a method for their production.

BACKGROUND OF THE INVENTION

At present, water-based paint compositions are replacing solvent-based paint compositions, as a paint, particularly in paint used for spraying automobiles. It is considered that this trend will increase in view of heightened awareness of the painting environment, the work environment and environmental pollution.

In general, polymer particles are often formulated in water-based (aqueous) paint compositions so as to improve paint workability. However, such a formulation of polymer particles always involve problems such as agglomeration, separation, thickening and the like. U.S. Pat. No. 4,403,003 discloses fine particles having a particle size of 0.01 to 10 µm which are formulated in a metallic-based paint. These fine particles ate produced according to a double-stage emulsion polymerization wherein core resin particles are formed and then a water-soluble polymer layer is formed thereon, to improve dispersion stability in an aqueous medium. However, the double-stage polymerization method is not practical because of its complicated operation. Further, the stability and the paint viscous property in an aqueous paint of particles, thus obtained, may not necessarily be sufficient.

OBJECTS OF THE INVENTION

One object of the present invention is to provide aqueous crosslinked polymer particles which provide excellent properties and coating workability.

Another object Of the present invention is to provide a process for producing aqueous crosslinked polymer particles.

These objects as well as other objects and advantages of the present invention will become apparent to those skilled in the art from the following description.

SUMMARY OF THE INVENTION

In order to obtain polymer particles which are stable in an aqueous medium and have improved viscous property, the present inventor have intensively studied polymer particles, with a viewpoint to the form and physical properties thereof, and the present invention has been completed.

According to the present invention, there is provided, aqueous crosslinked polymer particles having 20 to 200 nm average particle size (De), measured by a transmission electron microscope after dyeing with uranyl acetate, and having 0.5 to 0.9 of an average roundness (R) represented by the equation:

$$R=(Lc/L)^2$$

wherein Lc is a perimeter of a circle having the same area as that of a particle measured by the transmission electron microscope, and L is a perimeter of a particle measured actually.

The present invention also provides for the above defined aqueous crosslinked polymer particles, further having 1.8 to 3 of a water swelling degree (Dw/De) which is a ratio of an underwater particle size (Dw) of particles measured in an aqueous dispersion by a laser light scattering method to an average particle size (De) measured by the transmission electron microscope.

The present invention further provides the above aqueous crosslinked polymer particles, having not more than 1.5 of solvent swelling degree (Ds/Dw) which is a ratio of the undersolvent particle size (Ds), measured by the laser light scattering method after a small amount of an aqueous dispersion of particles is dispersed in a large amount of 1-ethoxy-2-propanol, to an underwater particle size (Dw).

DETAILED DESCRIPTION OF THE INVENTION

Generally, spherical polymer particles are normally formed by emulsion polymerization. However, it is considered that when they are not spherical particles but irregular particles, the result is a remarkably change in stability and viscous property of a paint composition using the present invention. These irregular particles can be formed by using a monomer, when formulated causes layer separation.

The aqueous crosslinked polymer particles of the present invention have an average particle size (De) measured by a transmission electron microscope after dyeing with uranyl acetate of 20 to 200 nm, preferably 20 to 80 nm. Further, it is necessary that the polymer particles of the present invention have 0.5 to 0.9, preferably 0.7 to 0.9 average roundness (R). The average roundness (R) is determined by the equation:

$$R=(Lc/L)^2$$

wherein Lc is a perimeter of a circle having the same area as that of a particle measured by the transmission electron microscope after dyeing with uranyl acetate, and L is a perimeter of a particle measured actually. The average roundness can be easily determined by subjecting an electron micrograph of the polymer particles to a computer image processing. When the average roundheads is close to 1, the particles have a high degree of roundness. When it is smaller than 1, the particles have a large distortion and are irregular in shape. In the present invention, polymer particles having a high degree of roundness, which is generally spherical, are not preferred because of poor stability in an aqueous paint.

In the aqueous crosslinked polymer particles of the present invention, it is preferred that a ratio of an underwater particle size (Dw) of particles measured in an aqueous dispersion by a laser light scattering method to the average particle size (De) measured by the transmission electron microscope [water swelling degree: Dw/De] is in the range of 1.8 to 3. Further, it is preferred that a ratio of the undersolvent particle size (Ds), measured by the laser light scattering method after a small amount of an aqueous dispersion of particles is dispersed in a large amount of 1-ethoxy-2-propanol, to an underwater particle size (Dw) [solvent swelling degree: Ds/Dw] is not more than 1.5, more preferably 1.0 to 1.5. The crosslinked polymer particles of the present invention are characterized in that they show a considerably high degree of swell characteristic in water and poor swelling degree in a solvent in comparison with the particles in water.

Even if the aqueous crosslinked polymer particles are synthesized by any method, the expected objects of the present invention can be accomplished as long as the above numerical limits are satisfied. Most preferably, the emulsion polymerization is conducted using three kinds of monomers, for example, a hydrophilic monomer, a hydrophobic monomer and a crosslinkable monomer for providing crosslinking. In the case of using a crosslinkable monomer having a hydrophilic functional group, the hydrophilic monomer may be eliminated. Examples of the hydrophilic functional groups include hydroxyl groups, carboxyl groups, amide groups (containing N-substituted groups) and the like. Examples of the hydroxyl group-containing monomers include 2-hydroxyethyl acrylate, 2-hydroxyethyl methacrylate, hydroxypropyl acrylate, hydroxypropyl methacrylate, hydroxybutyl acrylate, hydroxybutyl methacrylate, allyl alcohol and the like. Examples of the carboxyl group-containing monomers include acrylic acid, methacrylic acid, itaconic acid and the like, and examples of the amide group-containing monomer include acrylamide, methacrylamide, N-methylolacrylamide and the like.

The hydrophobic monomer, for example, are monomers having a general double bond other than the above hydrophilic monomere. Examples thereof include (meth)acrylates such as methyl (meth)acrylate, ethyl (meth)acrylate, n-butyl (meth)acrylate, isobutyl (meth)acrylate, t-butyl (meth)acrylate, 2-ethylhexyl acrylate, 2-ethylhexyl (meth)acrylate, lauryl (meth)acrylate, phenyl (meth)acrylate and the like; aromatic vinyl monomers such as ethylene, α-methylstyrene, p-butylstyrene, p-chlorostyrene, chloromethylstyrene and the like; nitriles such as (meth)acrylonitrile and the like; vinyl derivatives such as vinyl acetate, vinyl propionate and the like; dishes such as butadiene, isoprene and the like; and alkoxysilyl group-containing monomers such as vinyltrimethoxysilane, vinyltriethoxysilane, γ-methacryloxypropyltrimethoxysilane and the like.

In the present invention, since the particles used are crosslinked particles, it is necessary to use the crosslinkable monomer having at least two radical polymerizable group in an amount of 2 to 50% by weight based on the total monomers. By using the crosslinkable monomer, solvent resistance is improved. Further, layer separation occurs and irregularity is formed without using a large amount of styrene or acrylic long-chain alkyl ester having high hydrophobic nature and, therefore, particles having high hydrophilic nature are produced. Examples of the crosslinkable monomers include ethylene glycol di(meth)acrylate, polyethylene glycol di(meth)acrylate, 1,3-propanediol di(meth)acrylate, trimethylolpropane tri(meth)acrylate, 1,4-butanediol di(meth)acrylate, neopentyl glycol di(meth)acrylate, 1,6-hexanediol di(meth)acrylate, glycerol di(meth)aerylate, allyl (meth)acrylate, diallyl phthalate, divinylbenzene, methylenebis (meth)acrylamide, glyoxal di(meth)acrylamide and the like.

The polymer particles of the prevent invention can be prepared by subjecting the above monomer mixture to emulsion polymerization. The emulsifier used for the emulsion polymerization may be a normal emulsifier. Particularly, in the present invention, by using a reactive emulsifier, an amount of a water-soluble polymer formed is small even if a large amount of the hydrophilic monomer is used, thereby, viscosity can be lowered. Further, the polymer particles are hardly swollen in a solvent and, therefore, dispersibility becomes high even in an aqueous paint containing a solvent. A reactive emulsifier, an emulsifier wherein an allyl group or a methacryl group which imparts radical polymerizability when introduced in a compound having an emulsification function, is normally used. Of the reactive emulsifiers used in the present invention, methacrylic polyoxyethylene sulfate type emulsifier is preferred. The reactive emulsifier is used in an amount of 2 to 40% by weight based on the total weight of the above monomers.

The emulsion polymerization can be conducted by a conventional method. For example, it can be conducted at a polymerization temperature of 40° to 95° C. for 0.5 to 10 hours.

An aqueous dispersion of the particles of the present invention is obtained by the emulsion polymerization. By removing water from the aqueous dispersion, aqueous crosslinked polymer particles are obtained. The average roundness can be obtained by analyzing a transmission electron photograph of dried polymer particles dyed with uranyl acetate.

As described above, according to the present invention there are provided polymer particles which are stable in an aqueous paint and which can improve paint workability. The reason that the particles of the present invention are stable in an aqueous paint and they improve paint workability is not clear but it is considered that water swell and increase of the surface due to irregularity of the surface promote an interaction with a base resin to enhance viscosity. Further, it is also considered that a thick aqueous layer due to water swell becomes a stabilized layer, thereby, dispersibility is improved. Further, low swell characteristic to a solvent inhibits a solvent from being absorbed by a paint and stabilizes viscosity of the paint.

The following Examples, Comparative Examples and Production Example further illustrate the present invention in detail but are not to be construed to limit the scope thereof. Hereinafter, all "parts" are by weight unless otherwise stated.

EXAMPLE 1

A flask equipped with a stirrer, a reflux condenser, a thermometer, a nitrogen gas inlet and a dropping funnel was charged with 150 parts of deionized water and 4 parts of a reactive emulsifier RA-1022 (as an active component) and heated to 80° C. The flask was further charged with 5% of a monomer mixture of 54 parts of methyl methacrylate, 8 parts of n-butyl acrylate, 6 parts of 2-hydroxyethyl acrylate and 32 parts of neopentyl glycol dimethacrylate. Then, an initiator solution, wherein 0.5 parts of azobiscyanovaleric acid was neutralized with 0.32 parts of N,N-dimethylaminoethanol and the resultant was dissolved in 5 parts of deionized water, was added to initiate, the reaction. After 10 minutes, a pre-emulsified article prepared from 140 parts of deionized water, 21 parts of RA-1022 (as an active component) and the remained monomer was added dropwise over 120 minutes. At the same time, an initiator solution, wherein 0.5 parts of azobiscyanovaleric acid was neutralized with 0.32 part of N,N-dimethylaminoethanol and the resultant was dissolved in 200 parts of deionized water, was added dropwise over 130 minutes and maintained at 80° C. for 60 minutes. After cooling, the reaction mixture was filtered through a #400 mesh stainless steel net to obtain aqueous polymer fine particles dispersion having properties shown in Table 2.

EXAMPLE 2, 3, 7 AND 8 AND COMPARATIVE EXAMPLES 1 TO 4 AND 6

Aqueous polymer fine dispersions were obtained according to the same manner as that described in Example 1, using each formulation shown in Table 1. The properties of the aqueous polymer fine particles dispersion having properties obtained are in Table 2, respectively.

EXAMPLES 4 TO 6 AND COMPARATIVE EXAMPLES 5

N,N-dimethylaminoethanol neutralized with azobiscyanovalerio acid as the initiator of Example 1 was changed to ammonium persulfate. The initiator for initial addition, that in which 0.1 parts of ammonium persulfate was dissolved in 5 parts of deionized water was used, based on 100 parts of the monomer. The initiator for dropping, in which 0.2 parts of ammonium persulfate was dissolved in deionized water (of which amount is shown in Table 1), was used. After the completion of the reaction, the reaction mixture was neutralized with an aqueous N,N-dimethylaminoethanol solution (of which amount is shown in Table 1) to obtain aqueous polymer fine particles solution having properties shown in Table 2.

COMPARATIVE EXAMPLE 7

According to the same manner as that described in Example 1, a flask was charged with 100 parts of deionized water and 0.1 parts of an emulsifier Newcoal 707SF (as an active component) and heated to 80° C. The flask was further charged with 5% of a monomer mixture (for forming the core part) of 39 parts of methyl methacrylate, 39 parts of n-butyl acrylate and 2 parts of ethylene glycol. dimethacrylate. Then, an initiator solution, wherein 0.1 parts of ammonium persulfate was dissolved in 5 parts of deionized water, was added to initiate the reaction. After 10 minutes, a pre-emulsified article prepared from 50 parts of deionized water, 0.4 parts of Newcoal 707SF (as an active component) and the remained monomer was added dropwise over 90 minutes. At the same time, an initiator solution, wherein 0.2 parts of ammonium persulfate was dissolved in 50 parts of deionized water, was added dropwise over 150 minutes. When 20 minutes had passed after the completion of dropping the pre-emulsified article, a monomer mixture (for forming a shell part) of 4 parts of methyl methacrylate, 8 parts of n-butyl acrylate, 3 parts of methacrylic acid and 5 parts of 2-hydroxyethyl acrylate was added dropwise over 30 minutes. After the completion of dropping, the reaction mixture was maintained at 80° C. for 60 minutes. Then, this was neutralized with 0.9 parts of N,N-dimethylaminoethanol and 28 part of deionized water to obtain an aqueous polymer fine particles dispersion having the properties shown in Table 2.

PRODUCTION EXAMPLE 1

Water-soluble acrylic resin varnish

A flask equipped with a stirrer, a thermometer, a reflux condenser and a dropping funnel was charged with 76 parts of ethylene glycol monobutyl ether. To the flask, 61 parts of a monomer mixture of 45 parts of styrene, 63 parts of methyl methacrylate, 48 parts of 2-hydroxyethyl methacrylate, 117 parts of n-butyl acrylate, 27 parts of methacrylic acid and 3 parts of azobisisobutyronitrile was added and heated to 120° C. while stirring. While maintaining at the same temperature, 242 parts of the above monomer solution was added dropwise over 3 hours, followed by additional stirring for 1 hour. Then, 28 parts of dimethylethanolamine and 600 parts of deionized water were added to obtain an acrylic resin varnish having the solid content of 30% and the number average molecular weight of 1200 (of resin). This resin had an OH value of 70 and an acid value of 58.

TABLE 1

| | Emulsion polymerization formulation | | | | | | Neutralization | | |
|---|---|---|---|---|---|---|---|---|---|
| | Deionized water (I/P)* | Emulsifier (I/P)* | MMA | NBA | Monomer Hydrophilic | Crosslinkable | Initiator (I/P)* | DMEA/ deionized water | NV % |
| Ex. 1 | 150/140 | RA/4/21 | 54 | 8 | HEA/6 | NPG/32 | ACVA/5/200 | — | 20 |
| Ex. 2 | 130/100 | RA/4/11 | 40 | 20 | HEA/10 | EG/30 | ACVA/5/30 | — | 30 |
| Ex. 3 | 100/100 | RA/4/1 | 40 | 20 | HEA/10 | EG/30 | ACVA/5/200 | — | 20 |
| Ex. 4 | 100/100 | RA/4/11 | 40 | 20 | AA/10 | EG/30 | APS/5/30 | 3.7/28 | 30 |
| Ex. 5 | 100/80 | RA/4/6 | 40 | 20 | MAA/10 | GDM/30 | APS/5/30 | 3.1/37 | 30 |
| Ex. 6 | 100/80 | RA/4/6 | 50 | 25 | MAA/10 | GDM/15 | APS/5/30 | 3.1/37 | 30 |
| Ex. 7 | 130/100 | RA/4/11 | 40 | 20 | AAm/10 | EG/30 | ACVA/5/30 | — | 30 |
| Ex. 8 | 150/100 | HS/2/13 | 40 | 20 | HEA/10 | EG/30 | ACVA/5/20 | — | 20 |
| Comp. Ex. 1 | 100/100 | RA/1/0.5 | 60 | 30 | — | EG/10 | ACVA/5/200 | — | 20 |
| Comp. Ex. 2 | 150/140 | RA/4/21 | 54 | 14 | — | NPG/32 | ACVA/5/200 | — | 20 |
| Comp. Ex. 3 | 130/100 | RA/4/11 | 50 | 20 | — | EG/30 | ACVA/5/30 | — | 30 |
| Comp. Ex. 4 | 130/100 | RA/4/11 | 60 | 30 | HEA/10 | — | ACVA/5/30 | — | 30 |
| Comp. Ex. 5 | 150/100 | JS/2/4/6 | 50 | 25 | MAA/10 | GDM/15 | APS/5/130 | 3.1/20 | 20 |
| Comp. Ex. 6 | 150/100 | SE/3/12 | 40 | 20 | AAm/10 | EG/30 | ACVA/5/200 | — | 20 |
| Comp. Ex. 7 | 100/50 | NC/0.1 (Core) | 39 | 39 | — | EG/2 | APS/5/50 | 0.9/28 | 30 |
| | | /0.4 (Shell) | 4 | 8 | MAA/3 HEA/5 | — | | | |

*I/P: Initial charging/Pre-emulsification

Emulsifier

RA: RA-1022 having an active component of 90% (methaerylic type nonion sulfate, manufactured by Nippon Nyukazai Co., Ltd.)

HS: Aquaron HS-10 (β-methylstyryl type nonion sulfate, manufactured by Dai-ichi Kogyo Seiyaku Co., Ltd.)

SE: Adeka Reasoap SE-10N (allyl type nonion sulfate, manufactured by Asahi Denka Kogyo K.K.)

JS2: Eleminol JS-2 having an active component of 38% (allyl type sulfonate, manufactured by Sanyo Chemical Industries, Ltd.)

NC: Newcol 707SF having an active component of 30% (non-reactive nonion eulfate, manufactured by Nippon Nyukazai Co., Ltd.)

Monomer

MMA: Methyl methacrylate

NBA: n-Butyl acrylate

HEA: 2-Hydroxyethyl acrylate

AA: Acrylic acid

MAA: Methacrylic acid

AAm: Acrylamide

NPG: Neopentyl glycol dimethacrylate

EG: Ethylene glycol dimethacrylate

GDM: Glycerin dimethacrylate

Initiator

ACVA: Azobiscyanovarelic acid

APS: Ammonium persulfate

Formulation

Deionized water: Initial charging is an amount to be charged in a flask before a reaction, and pre-emulsification is an amount to be used for emulsifying a monomer added dropwise.

Emulsifier: It is an amount of an active component to be used for initial charging and pre-emulsification based on 100 parts of a monomer.

Monomer: It is an amount based on 100 parts of a monomer, and 5% of a mixture is used for initial charging.

Initiator: ACVA is used in an amount of 1 part based on 100 parts of a monomer (0.5 parts thereof are used for initial charging). APS is used in an amount of 0.3 parts based on 100 parts of a monomer (0.1 parts thereof are used for initial charging).

An amount of deionize water is used for adding dropwise together with pre-emulsified article for initial charging.

Neutralization

It is an amount of N,N-dimethylaminoethanol (DMEA)/ deionized water for dilution based on 100 parts of a monomer (corresponding to 30 molar % based on an amount of the acidic monomer used).

TABLE 2

| | Particle Size Dw (nm) | Particle size De (nm) | Particle size Ds (nm) | Water swelling degree, Dw/De | Solvent swelling degree, Ds/Dw | Roundness | Paint properties Stability | Viscosity |
|---|---|---|---|---|---|---|---|---|
| Ex. 1 | 118 | 62.2 | 139 | 1.90 | 1.17 | 0.88 | A | A |
| Ex. 2 | 85.6 | 39.9 | 87.1 | 2.15 | 1.02 | 0.86 | A | A |
| Ex. 3 | 86.9 | 31.1 | 100 | 2.79 | 1.15 | 0.88 | A | B |
| Ex. 4 | 82.3 | 38.9 | 94.2 | 2.16 | 1.14 | 0.87 | A | A |
| Ex. 5 | 101 | 40.7 | 109 | 2.48 | 1.08 | 0.81 | A | A |
| Ex. 6 | 86.6 | 37.8 | 122 | 2.29 | 1.41 | 0.80 | A | A |
| Ex. 7 | 89.5 | 33.0 | 92.7 | 2.71 | 1.04 | 0.81 | A | A |
| Ex. 8 | 104 | 49.4 | 109 | 2.11 | 1.05 | 0.72 | A | B |
| Comp. Ex. 1 | 128 | 80.2 | 181 | 1.60 | 1.41 | 0.94 | B | C |
| Comp. Ex. 2 | 98.0 | 56.1 | 121 | 1.75 | 1.23 | 0.91 | B | C |
| Comp. Ex. 3 | 87.9 | 48.3 | 86.6 | 1.82 | 0.99 | 0.90 | B | B |
| Comp. Ex. 4 | 83.8 | 44.6 | 224 | 1.88 | 2.67 | 0.98 | C | B |
| Comp. Ex. 5 | 58.8 | 24.7 | 110 | 2.38 | 1.87 | 0.79 | A | C |
| Comp. Ex. 6 | 61.5 | 33.5 | 103 | 1.84 | 1.67 | 0.79 | A | C |
| Comp. Ex. 7 | 119 | 88.2 | 230 | 1.35 | 1.93 | 0.98 | B | C |

(Evaluation method)

Particle size

Dw: It is a measured value of an aqueous dispersion by a laser beam scattering method.

De: It is a value measured by a transmission electron microscope after dyeing with uranyl acetate.

Ds: It is a value measured by a laser beam scattering method after a small amount of an aqueous disperion was dispersed in a large amount of 1-ethoxy-2-propanol.

In the measurement by a laser light scattering method, a model N4 manufactured by Coulter Electronics, Inc. was used.

In the measurement by a transmission electron microscope method, a JEM-2000FX-II manufactured by JEOL Ltd. was used.

Roundness

A transmission electron microscope photograph was subjected to image processing and roundness R was calculated from the equation:

$$R = [L_c/L]^2$$

wherein $L_c$ is the perimeter of a circle having the same area as that of a particle, and L is a perimeter of a particle measured actually.

The image processing was conducted using an EXCEL manufactured by Nippon Avionic Co., Ltd.

Stability

An aqueous melamine resin Sumimal M-50W (manufactured by Sumitomo Chemical Co., Ltd.) and each of the aqueous polymer particles dispersion were added in turn to an aqueous acrylic resin varnish of Production Example 1 while stirring with a mixer such that the ratio of a solid content become 70:30:15, and then the viscosity was adjusted to 30 seconds (Fordcup No.4) to prepare a clear paint.

This paint was allowed to stand at 40° C. for 2 weeks and applied on a glass plate by a coater (4 mill) and then baked at 140° C. for 30 minutes. The appearance was evaluate by the following criteria.

A: clear

B: slightly turbid

C: extremely turbid, or agglomerates are formed

Viscosity

A low shear viscosity of the above viscosity-adjusted paint (E type visometer, measured at $10^{-1}$ $sec^{-1}$) as well as that a concentrated paint of which solid content was increased in an amount of 5% by evaporating the water content and solvent content of the paint, and then the following evaluation was conducted in view of the degree of viscosity increase.

A: viscosity increase is not less than 500 poise

B: viscosity increase is not less than 400 poise

C: viscosity increase is less than 400 poise

What is claimed is:

1. Aqueous crosslinked polymer particles having:

(1) 20 to 200 nm of an average particle size (De), measured by a transmission electron microscope after dyeing with uranyl acetate, (2) 0.5 to 0.9 of an average roundness (R) represented by the equation:

$$R=(Lc/L)^2$$

wherein Lc is a perimeter of a circle having the same area as that of a particle measured by the transmission electron microscope, and L is a perimeter of a particle measured actually, (3) 1.8 to 3 of a water swelling degree (Dw/De) which is a ratio of an underwater particle size (Dw) of particles measured in an aqueous dispersion by a laser light scattering method to an average particle size (De) measured by the transmission electron microscope, and (4) not more than 1.5 of a solvent swelling degree (Ds/Dw). which is a ratio of the undersolvent particle size (Ds), measured by the laser light scattering method after a small amount of an aqueous dispersion of particles is dispersed in a large amount of 1-ethoxy-2-propanol, to an underwater particle size (Dw).

2. Aqueous crosslinked polymer particles according to claim 1, having 1.8 to 3 of a water swelling degree (Dw/De), and not more than 1.5 of a solvent swelling degree (DS/Dw).

3. An aqueous dispersion containing aqueous crosslinked polymer particles according to claim 1.

4. A process for producing aqueous crosslinked polymer particles according to claim 1, which comprises preparing an emulsion containing a monomer mixture comprising:

(1) 2 to 50% by weight of a radical polymerizable monomer having a hydrogen bonding functional group selected from hydroxyl group, amide group and carboxyl group;

(2) 2 to 50% by weight of a crosslinkable monomer having at least two radical polymerizable groups in a molecule; and (3) 40 to 90% by weight of a radical polymerizable monomer other than the above monomers (1) and (2), and a reactive emulsifier having both a methacrylic group and a polyoxyetbylene sulfate group, and comprising 2 to 40% by weight based on the total amount of the monomer mixture, and then conducting an emulsion polymerization.

5. A process for producing aqueous crosslinked polymer particles according to claim 2, which comprises:

(1) 2 to 50% by weight of a radical polymerizable monomer having a hydrogen bonding functional group selected from a hydroxyl group, an amide group and carboxyl groups;

(2) 2 to 50% by weight of a cross linkable monomer having at least two radical polymerizable groups in a molecule; and (3) 40 to 90% by weight of a radical polymerizable monomer other than the above monomers (1) and (2), and a reactive emulsifier having both a methacrylic group and a polyoxyethylene sulfate group comprising 2 to 40% by weight based on the total amount of the monomer mixture, and then conducting an emulsion polymerization.

6. An aqueous dispersion containing aqueous crosslinked polymer particles according to claim 2.

7. An aqueous dispersion containing aqueous crosslinked polymer particles according to claim 4.

8. An aqueous dispersion containing aqueous crosslinked polymer particles according to claim 5.

* * * * *